(12) United States Patent
Yokoyama

(10) Patent No.: US 10,038,816 B2
(45) Date of Patent: Jul. 31, 2018

(54) INFORMATION PROCESSING APPARATUS, DISPLAY CONTROL METHOD AND NON-TRANSITORY COMPUTER-READABLE STORAGE MEDIUM

(71) Applicant: CANON KABUSHIKI KAISHA, Tokyo (JP)

(72) Inventor: Tatsuyuki Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/434,214

(22) Filed: Feb. 16, 2017

(65) Prior Publication Data

US 2017/0264780 A1   Sep. 14, 2017

(30) Foreign Application Priority Data

Mar. 10, 2016   (JP) .................................. 2016-047370

(51) Int. Cl.
*G06F 3/12* (2006.01)
*H04N 1/32* (2006.01)
*H04N 1/00* (2006.01)
*H04N 1/333* (2006.01)

(52) U.S. Cl.
CPC ..... *H04N 1/32662* (2013.01); *H04N 1/00204* (2013.01); *H04N 1/33384* (2013.01); *H04N 2201/0094* (2013.01); *H04N 2201/33307* (2013.01)

(58) Field of Classification Search
None
See application file for complete search history.

(56) References Cited

U.S. PATENT DOCUMENTS

| 2001/0034251 | A1* | 10/2001 | Goto | H04M 1/22 455/566 |
| 2006/0092460 | A1* | 5/2006 | Shikata | G06F 3/1207 358/1.15 |
| 2009/0021776 | A1* | 1/2009 | Dolan | G06F 3/1222 358/1.15 |
| 2012/0221901 | A1* | 8/2012 | Tanaka | G06F 11/0709 714/57 |
| 2015/0077777 | A1 | 3/2015 | Hayakawa | |
| 2017/0013148 | A1 | 1/2017 | Hayakawa | |

FOREIGN PATENT DOCUMENTS

JP   2015-060400 A   3/2015

* cited by examiner

*Primary Examiner* — Huo Long Chen
(74) *Attorney, Agent, or Firm* — Fitzpatrick, Cella, Harper & Scinto

(57) ABSTRACT

An information processing apparatus capable of communicating with an external apparatus, comprises: an obtainment unit that obtains information from an external apparatus; a determination unit that determines an operation mode of the information processing apparatus; and a notification unit that performs a notification based on the information obtained by the obtainment unit, wherein the notification unit, if the mode determined by the determination unit is a specific operation mode, performs the notification based on the information obtained by the obtainment unit in a second notification screen that is smaller than a first notification screen, and, if the mode determined by the determination unit is not the specific operation mode, performs the notification based on the information obtained by the obtainment unit in the first notification screen.

24 Claims, 8 Drawing Sheets

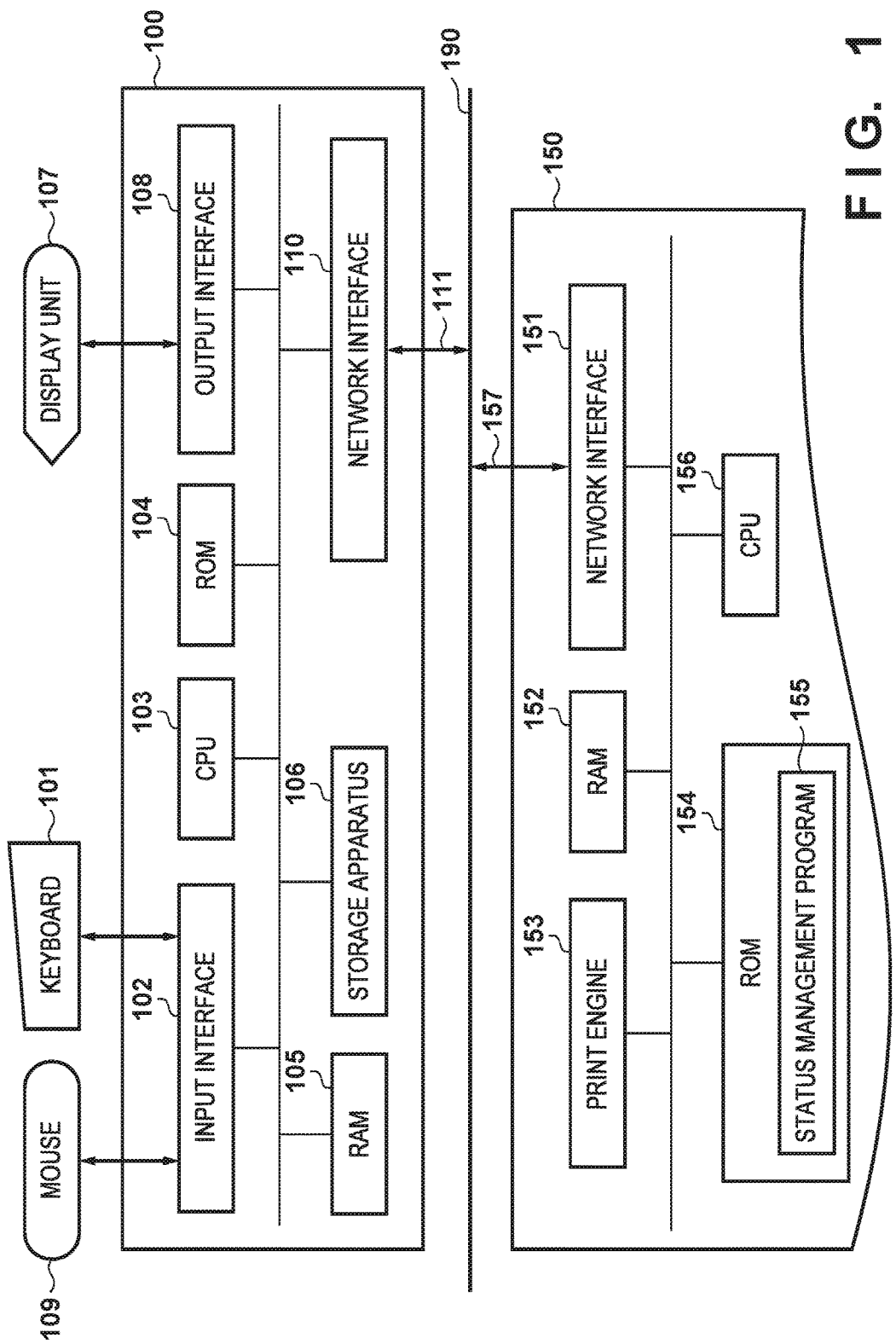

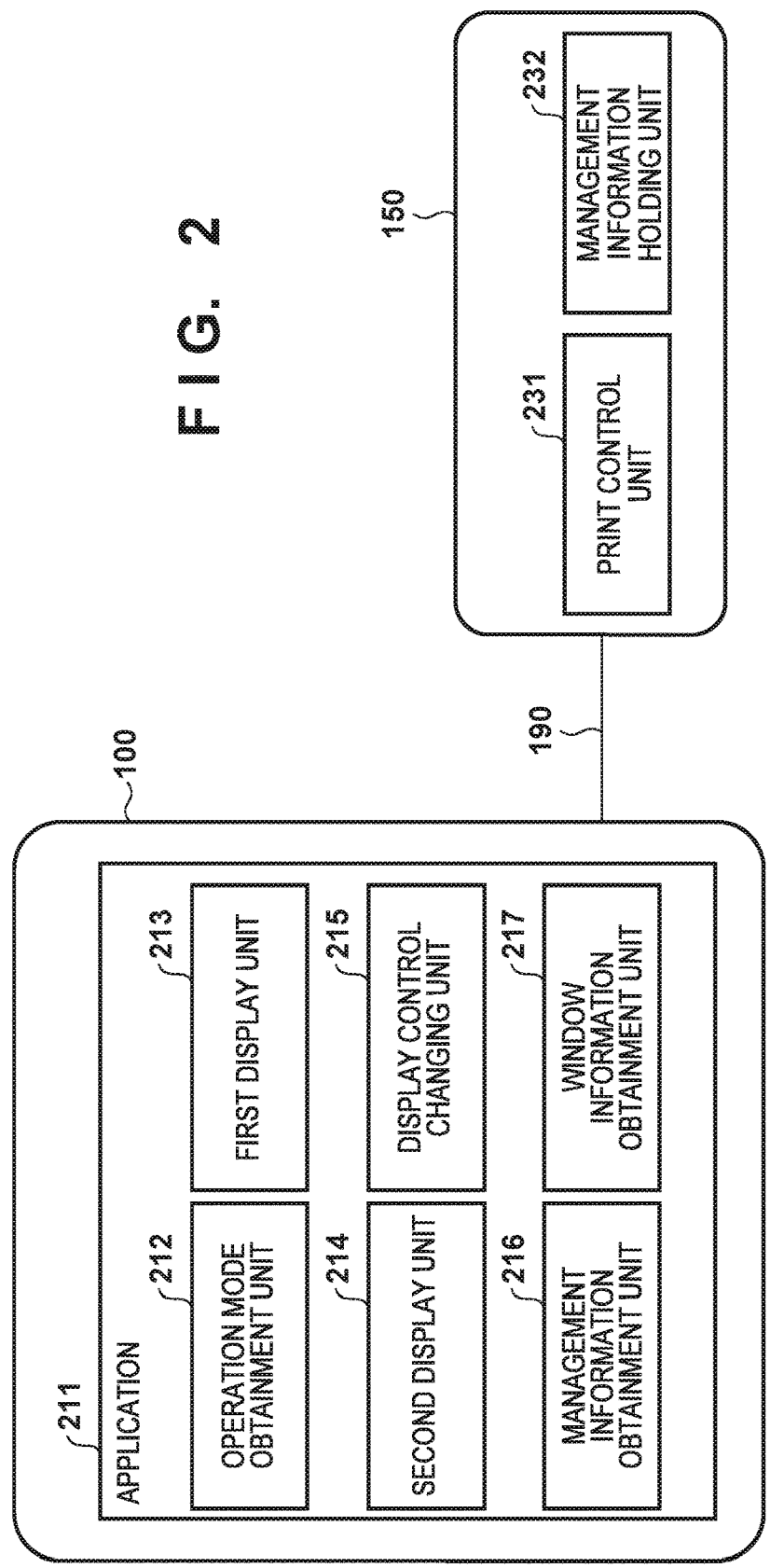

INFORMATION PROCESSING APPARATUS, DISPLAY CONTROL METHOD AND NON-TRANSITORY COMPUTER-READABLE STORAGE MEDIUM

BACKGROUND OF THE INVENTION

Field of the Invention

The present invention relates to an information processing apparatus, a display control method, and a non-transitory computer-readable storage medium.

Description of the Related Art

Conventionally, there is a technique that can switch an operation mode of an operating system (hereinafter, OS) that operates on an information processing apparatus. For example, in Windows 10 (registered trademark) which is an OS of Microsoft Corporation, a desktop mode premised upon usage while a plurality of windows are displayed, and a tablet mode premised upon usage of one window in a full screen mode are implemented. A user can perform work while changing the operation mode of the OS in accordance with an intended use.

Some applications perform a notification to a user by performing a pop-up display of a screen under specific conditions (an error occurrence or the like). If a notification by a pop-up of a screen is performed during work in the tablet mode described above, there is a possibility that it would obstruct a user operation. Therefore, a technique (refer to Japanese Patent Laid-Open No. 2015-060400) for preventing a reduction of work efficiency by not performing a display of predetermined information when it is detected that the OS is operating in a specific operation mode premised upon being used in a full screen mode such as the tablet mode described above is proposed.

However, in the specific operation mode, if configuration is taken such that a notification regarding an error that has occurred in a printer is not performed, there may be cases where inconvenience occurs when using a device such as a printer. For example, there may be a case in which a user does not notice that printing that they have executed has stopped due to a printer error or the like. When a printer remains stopped due to an error or the like, in a case where the printer is being used by sharing in an office environment or the like, this may lead to also obstructing the work of other users who cause subsequent printing to be executed. Accordingly, performing a notification that obstructs a user operation as little as possible in a specific operation mode such as the tablet mode described above is required.

SUMMARY OF THE INVENTION

According to one aspect of the present invention, there is provided an information processing apparatus capable of communicating with an external apparatus, the information processing apparatus comprising: an obtainment unit configured to obtain information from an external apparatus; a determination unit configured to determine an operation mode of the information processing apparatus; and a notification unit configured to perform a notification based on the information obtained by the obtainment unit, wherein the notification unit, if the mode determined by the determination unit is a specific operation mode, performs the notification based on the information obtained by the obtainment unit in a second notification screen that is smaller than a first notification screen, and, if the mode determined by the determination unit is not the specific operation mode, performs the notification based on the information obtained by the obtainment unit in the first notification screen.

According to another aspect of the present invention, there is provided a display control method in an information processing apparatus capable of communicating with an external apparatus, comprising: obtaining information from an external apparatus; determining an operation mode of the information processing apparatus; and performing a notification based on the obtained information, wherein if the mode determined is a specific operation mode, performs the notification based on the obtained information in a second notification screen that is smaller than a first notification screen, and, if the mode determined is not the specific operation mode, performs the notification based on the obtained information in the first notification screen.

According to another aspect of the present invention, there is provided a non-transitory computer-readable storage medium storing a program for causing a computer to function as: an obtainment unit configured to obtain information from an external apparatus; a determination unit configured to determine an operation mode of the computer; and a notification unit configured to perform a notification based on the information obtained by the obtainment unit, wherein the notification unit, if the mode determined by the determination unit is a specific operation mode, performs the notification based on the information obtained by the obtainment unit in a second notification screen that is smaller than a first notification screen, and, if the mode determined by the determination unit is not the specific operation mode, performs the notification based on the information obtained by the obtainment unit in the first notification screen.

By the present application invention, it is possible to suitably perform a notification to a user in accordance with an operation mode of an information processing apparatus.

Further features of the present invention will become apparent from the following description of exemplary embodiments (with reference to the attached drawings).

BRIEF DESCRIPTION OF THE DRAWINGS

FIG. 1 is a view illustrating an example of a hardware configuration of a printing apparatus and an information processing apparatus according to the present application invention.

FIG. 2 is a view illustrating an example of a configuration of the printing apparatus and the information processing apparatus according to a first embodiment.

DESCRIPTION OF THE EMBODIMENTS

Figure 3A:
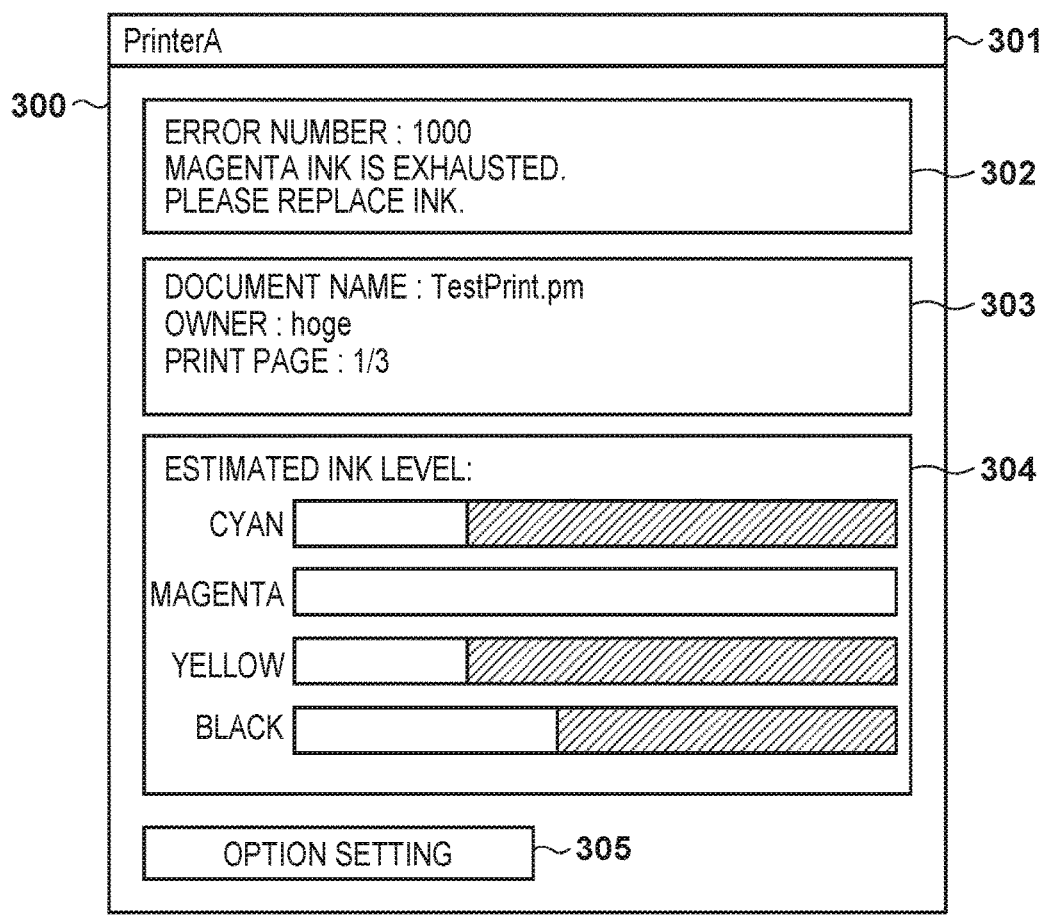
FIGS. 3A and 3B are views illustrating display examples of notifications according to the present application invention.

Below, explanation is given in detail of preferred embodiments of the present invention, with reference to the accompanying drawings. Note that the following embodiments do not limit the present invention in regard to the scope of the patent claims, and, in addition, there is no limitation to all combinations of the features explained in the embodiments being necessary for means for solving the present invention.

First Embodiment

With reference to FIG. 1, explanation is given of an example of a hardware configuration of an information processing apparatus and a printing apparatus according to the present embodiment. Note that, in the present embodiment, explanation is given in which a printing apparatus is raised as an example of an external apparatus that connects to an information processing apparatus. However, there is no limitation to this, and an external apparatus may be an MFP (Multi-Function Peripheral), an image forming apparatus such as a scanner apparatus or a FAX apparatus, or may be another apparatus.

An information processing apparatus 100 has an input interface 102, a CPU 103, a ROM 104, a RAM 105, a storage apparatus 106, an output interface 108, a display unit 107, a keyboard 101, a mouse 109, and a network interface 110. The network interface 110 is connected via a network cable 111 to a network 190. The CPU 103 (central processing unit) performs calculation processing to control the operations of each unit of the information processing apparatus 100. The ROM 104 is a non-volatile storage region and stores an initialization program or the like. The storage apparatus 106 is a non-volatile storage region and saves a group of application programs, an OS (operating system), a printer driver, and other various data. The RAM 105 is a volatile storage region and is used as a work memory by various programs stored in the storage apparatus 106, which is a hard disk or the like. In addition, the information processing apparatus 100 according to the present embodiment is assumed to be able to switch the operation modes of the OS (not shown) that operates in the information processing apparatus 100. Here, explanation is given of an example of a desktop mode and a tablet mode used in Windows 10 (registered trademark), an OS of Microsoft Corporation. As described above, the tablet mode is an operation mode premised on the fact that a window is used in a full screen mode and is referred to as a first operation mode for convenience here. Also, the desktop mode is an operation mode in which it is possible to display several windows in a screen and is referred to as a second operation mode for convenience here.

The mouse 109 and the keyboard 101 are operation units, and a user can use them to appropriately perform various kinds of necessary settings. The information processing apparatus 100 can accept a user input from an operation unit, via the input interface 102. An image is displayed in the display unit 107, by outputting image data to the display unit 107 via the output interface 108. Note that, in the present embodiment, although the display unit 107 and the operation units are given as different configurations, there is no limitation to this, and they may be configured such that at least a portion thereof is integrated as with a touch panel or the like. In addition, the network interface 110 is connected via the network cable 111 to the network 190. Note that configuration may be taken so as to connect to the network 190 by wireless communication.

A printing apparatus 150 has a network interface 151, a RAM 152, a print engine 153, a ROM 154, and a CPU 156. The network interface 151 is connected via a network cable 157 to the network 190. Note that configuration may be taken so as to connect to the network 190 by wireless communication. The RAM 152 is a volatile storage region, is used as a work memory and a main memory of the CPU 156, and saves various data or a reception buffer for temporarily saving a received print job. The print engine 153 is included in a printing unit that performs printing based on data saved in the RAM 152. The ROM 154 is a non-volatile storage region, and stores various control programs such as a status management program 155, and data used by each control program. The CPU 156 (central processing unit) performs calculation processing to control the operations of each unit of the printing apparatus 150. The CPU 156 controls each unit of the printing apparatus 150 in accordance with a control program stored in the ROM 154.

The status management program 155 is a program for monitoring a processing status of a print job or a state of the printing apparatus 150 based on, for example, information of various sensors (not shown) in the printing apparatus 150, generating status information, and storing it in the RAM 152.

Here, although distribution of processing of the information processing apparatus 100 and the printing apparatus 150 was described above as an example, there is no limitation in particular to this distribution configuration, and another configuration may be used.

FIG. 2 illustrates a software configuration example of a system according to the first embodiment. As illustrated in FIG. 1, the information processing apparatus 100 and the printing apparatus 150 are communicably connected.

The information processing apparatus 100 transmits a print job to the printing apparatus 150 via the network 190, by a printer driver (not shown) or the like. The printing apparatus 150 performs print processing by controlling a printing unit (not shown) in accordance with the print control unit 231.

An application 211 operates on the information processing apparatus 100. The application 211 is a module of a portion of a printer driver (not shown), and is an application for causing management information of the printing apparatus 150 which is an external apparatus to be displayed. The application 211 starts when an execution button for printing is selected, or when a start button of the application 211 is selected. The application 211 is configured by including an operation mode obtainment unit 212, a first display unit 213, a second display unit 214, a display control changing unit 215, and a management information obtainment unit 216. The operation mode obtainment unit 212 can obtain operation mode information of the OS. The first display unit 213 causes a UI of the application 211 to be displayed on the display unit 107. The management information obtainment unit 216 obtains management information that is obtained from the printing apparatus 150. The first display unit 213 performs a detailed display relating to a state of the printing apparatus 150, based on the obtained management information. Explanation is given by FIG. 3A regarding a display example of the UI. The second display unit 214 causes, on the display unit 107, a simple display so as not to obstruct a user operation. For example, the second display unit 214 performs a display by using an OS notification function from the application 211. Explanation is given by FIG. 3B regarding a display example.

A window information obtainment unit 217 obtains window information of other software currently being displayed in the display unit 107 of the information processing apparatus 100. The display control changing unit 215 changes the display of the application 211, based on the information obtained by the operation mode obtainment unit 212 and the information obtained by the window information obtainment unit 217. Using FIG. 5, explanation is given later regarding a display change flow of the application 211. Via the network 190, the management information obtainment unit 216 obtains, for example, job information or ink information of the printing apparatus 150 that is caused to be held by a management information holding unit 232 in the printing apparatus 150. Note that, in the present embodiment, although configuration is such that information is obtained via the network 190, configuration may be taken obtain information after connecting the information processing apparatus 100 and the printing apparatus 150 by an interface such as USB or IEEE 1394.

FIG. 3A illustrates an example of a notification screen that the application 211 displays by using the first display unit 213. FIG. 3A is an error notification screen, and is one kind of notification screen that is notified by the application 211. A notification screen that is notified when in the desktop mode is assumed to be a first notification screen. Note that the first notification screen is presented by the application 211. A screen 300 of the application 211 is configured by including a title bar 301, a message display portion 302, a job information display portion 303, an ink information display portion 304, and an option setting button 305. The title bar 301 displays an application name, a printer name, or the like. The message display portion 302 displays a message for indicating the state of the printing apparatus 150 based on the information obtained by the management information obtainment unit 216. Although FIG. 3A is illustrated as something for displaying information that indicates error content and a message for prompting a user to cancel the error, configuration may be taken to display only one of these. The job information display portion 303 displays information relating to a print job being executed by the printing apparatus 150, based on the information obtained by the management information obtainment unit 216. The ink information display portion 304 performs a display regarding ink information of the printing apparatus 150 based on the information obtained by the management information obtainment unit 216. By pressing the option setting button 305, an option setting screen 400 that is explained later is displayed.

Figure 3B:
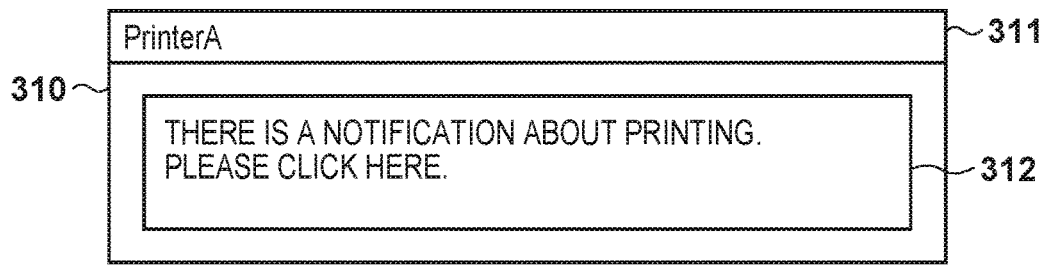

FIG. 3B illustrates an example of a notification screen that the application 211 displays by using the second display unit 214. Illustrated here is a display example that uses a toast notification function that is a notification function of a Windows (registered trademark) OS of Microsoft Corporation.

In the present embodiment, a display that uses the toast notification function when an error has occurred in the tablet mode is performed. In the present embodiment, the screen 310 is used in place of the screen 300 of FIG. 3A when performing a simplified notification. Note that there is no limitation to a toast notification function, and another notification function of the OS may be used to perform a simple UI display. In addition, a simple UI display may be performed by a function of the application 211 itself. A title bar 311 displays an application name, a printer name, or the like. A message display portion 312 displays a message indicating that there is a notification regarding printing. Configuration may be taken to use the first display unit 213 to display the UI of the application 211 when a user clicks on the message display portion 312. A second notification screen presented by the toast notification function has a smaller display size than the first screen. For a display position in the screen, it is displayed on an edge portion side of the window.

Figure 4:
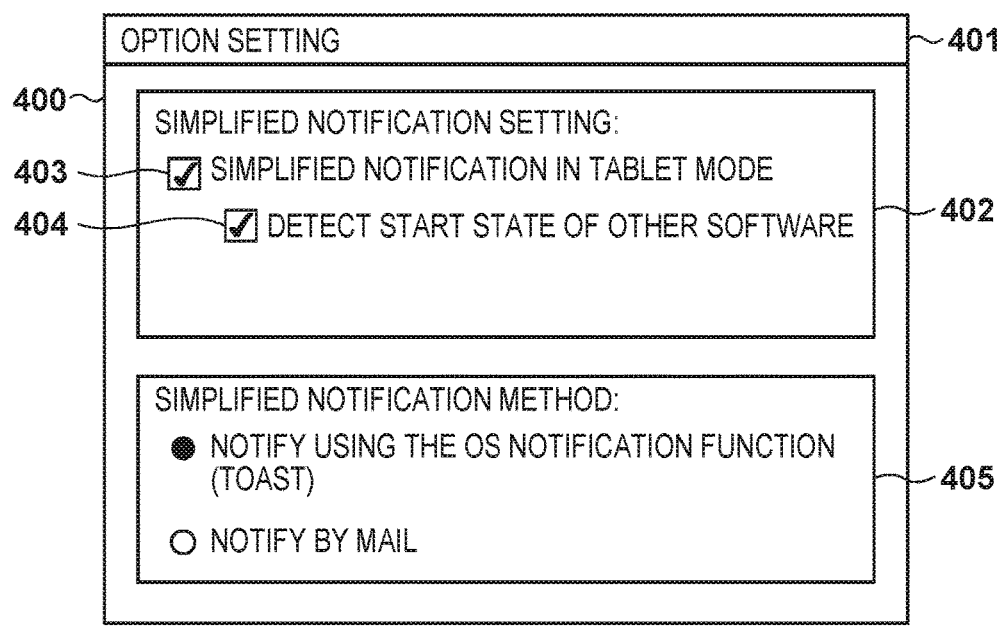
FIG. 4 is a view illustrating a display example of an option setting screen according to the first embodiment.

FIG. 4 illustrates a display example of the option setting screen 400 of the application 211 according to the first embodiment. The option setting screen 400 is displayed when the option setting button 305 of the screen 300 is pressed. The option setting screen 400 is used when performing condition setting when performing a simplified notification, and by this realizes a condition setting receiving unit. The option setting screen 400 is configured by including a title bar 401, a simplified notification setting portion 402, and a simplified notification method setting portion 405. The title bar 401 displays the name of a dialog, such as "option setting". In the simplified notification setting portion 402, a setting item 403 that enables selection of whether to perform a simplified notification in the specific operation mode (here, the tablet mode) in the OS is included. Furthermore, when the setting item 403 is ON, a setting item 404 for whether to detect a start state of other software is included. As a default setting, the setting item 403 is ON by the entry of a check in a check-box. In this state, upon detecting being in the tablet mode, if an error occurs in the printing apparatus 150, a simplified notification as illustrated in FIG. 3B is performed. If the check of the setting item 403 is removed to turn the setting OFF, if, in the tablet mode, an error occurs in the printing apparatus, notification is performed by displaying the screen 300 illustrated in FIG. 3A.

As a default setting, the setting item 404 is ON by the entry of a check in a check-box. In this state, upon detecting the tablet mode and that a window of another piece of software is started, the screen 310 as illustrated in FIG. 3B is used to perform a simplified notification. In other words, even in the tablet mode, if a window of another piece of software is not started, the screen 300 as illustrated in FIG. 3A is used to perform a notification. Due to removing the check of the setting item 404 to turn the setting OFF, a simplified notification is performed if in the tablet mode, regardless of a start state of other software. In other words, when not the specific operation mode (here, when in the desktop mode), a notification is performed by a method other than a simplified notification.

By the simplified notification method setting portion 405, it is possible to alternatively select by a radio button whether to perform a notification by email or whether to perform a notification by using an OS notification function (toast), as methods of a simplified notification. Here, it is assumed that a setting for performing a notification by using the OS notification function (toast) is made as a default setting. Note that configuration may be taken such that it is possible to further perform a setting of an email address when notification by email is selected. In addition, configuration may be taken such that it is possible to select both as the method of a simplified notification.

Figure 5:
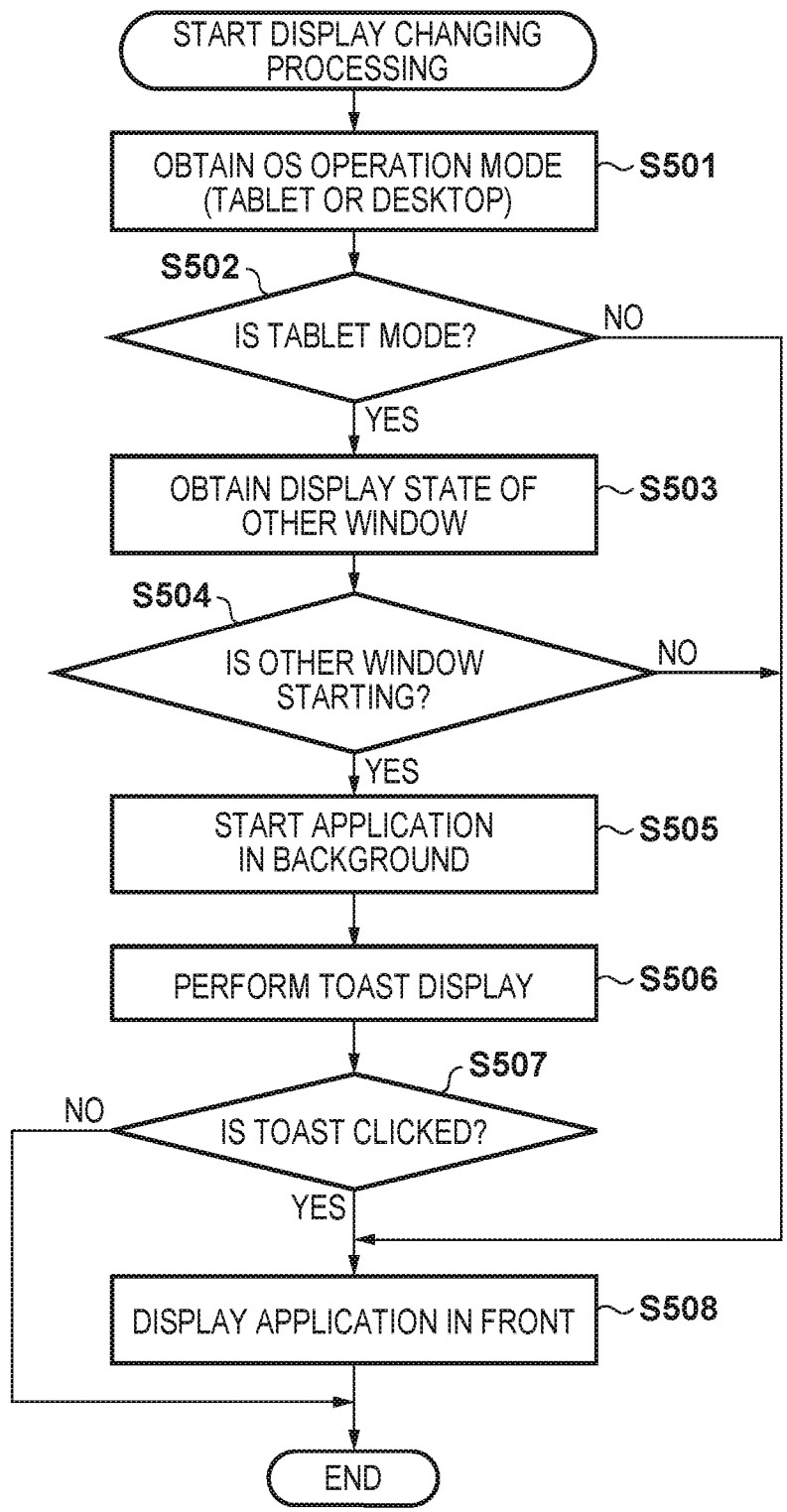
FIG. 5 is a flowchart for display change processing according to the first embodiment.

FIG. 5 is a flowchart of display change processing when the application 211 according to the first embodiment is started. This processing flow is realized by the CPU 103 of the information processing apparatus 100 reading the application 211 stored in the storage apparatus 106 or the like and executing it. For FIG. 5, it is assumed to be a state in which, in the option setting screen 400 illustrated in FIG. 4, the setting items 403 and 404 of the simplified notification setting portion 402 are both set to ON, and the simplified notification method setting portion 405 is set so that notifications are performed using the OS notification function (toast).

When a user uses the printing apparatus 150 to execute printing, a printer driver (not shown) equipped by the information processing apparatus 100 starts the application 211. Note that, regarding a method of starting the application 211, for example, the application 211 may be started by a user operation, or another piece of software that detects, for example, that an error has occurred in the printing apparatus 150 may start the application 211.

In step S501, the application 211 obtains the operation mode of the OS by the operation mode obtainment unit 212.

In step S502, the application 211 determines whether the operation mode of the OS is the tablet mode. If the operation mode of the OS is the tablet mode (YES in step S502), a transition is made to the processing of step S503. Note that the operation mode is not limited to the desktop mode and the tablet mode. For example, additionally, configuration may be taken so as to handle a case of a full-screen mode, which is used so as to not allow another window to be displayed when a user appreciating a game, a DVD, or the like, similarly to the tablet mode. When not the tablet mode, in other words when the desktop mode (NO in step S502), transition is made to the processing of step S508.

In step S503, the application 211 obtains window information of another piece of software that is being displayed on the OS. Specifically, information relating to the display state of another window is obtained here.

In step S504, the application 211 determines whether the window of the other piece of software is present on the screen of the OS. In other words, it is determined whether the window of the other piece of software is being displayed on a foreground on the OS screen. If the window of the other piece of software is present (YES in step S504), a transition is made to the processing of step S505, and if it is not present (NO in step S504), a transition is made to the processing of step S508.

In step S505, the application 211 determines to perform a background start, and operation continues in the background without causing the UI of the application 211 to be displayed.

In step S506, the application 211 uses the notification function of the OS (toast notification function) to perform a toast display as illustrated in FIG. 3B, by the second display unit 214. By this, the application 211 notifies information to a user.

A toast used here is an OS standard notification method that is implemented in Windows 8 (registered trademark) onward. A toast display is a simplified notification screen, and for example a screen size is decided in advance, only characters can be displayed, and there are also restrictions on a number of characters displayed. A toast display also does not steal the focus of an application window (UI) that a user is operating (is currently being displayed). In addition, a toast display has a notification interval of approximately five seconds by default, and when that interval passes, the toast display disappears from the screen. Therefore, it is possible to make a notification to the effect that there is information that should be notified, obstructing user work as little as possible. In addition, even if a toast display disappears, a history remains in history information of the OS. Therefore, even if a user misses clicking on a toast in the set interval, it is possible to start the application from the OS history information.

For the display content of toast, configuration may be taken to show simplified information to the effect that there is some kind of notification regarding printing as illustrated in FIG. 3B, or display an overview of notification content by a screen. By this, it becomes possible to perform a notification that is limited to simple information. In addition, configuration may be taken to have a simpler display by making a message displayed in a toast be as short as possible. As a trigger of a toast display, an application 211 side may make an instruction by an API (Application Programming Interface) for performing a toast display, or it may be left to an OS side. In a case where a toast display is left to the OS, for example there is a necessity to obtain an event regarding an error or the like of a printing apparatus, and perform an event setting to output a toast. If an application makes an instruction for a toast display, it is possible to arbitrarily control a display time of the toast, a position at which it is displayed, and a message to display. When leaving the toast display to the OS, it is possible for the OS to detect an event and display a toast without performing regular monitoring of the state of the printing apparatus by the application program side.

As an example of a simplified notification, although explanation was given regarding a method by a toast display, configuration may be taken to perform a UI display without impeding a user operation as much as possible other than this. Note that, in this case too, it is assumed to be something smaller than the first notification screen. For example, it is assumed to be something that is approximately equal to a toast display or is smaller than a toast display. Configuration may be taken to, for example, display by making the size of the UI of the application 211 small while the application is started in the background. In addition, configuration may be taken to display by changing the display position of the UI of the application 211 to a screen edge or the like, and configuration may be taken to limit detail displayed on the UI of the application 211 to be only the message display portion 302, for example.

In step S507, the application 211 determines whether a screen displayed by the toast notification function has been clicked. If the screen displayed by the toast notification function has been clicked (YES in step S507), a transition is made to the processing of step S508, and if not clicked (NO in step S507), this processing flow terminates.

In step S508, the application 211 displays the UI of the application 211 indicated in FIG. 3A in the foreground, by the first display unit 213. At this point the toast display disappears. The first display unit 213 displays information of each ink of the printing apparatus 150, by the ink information display portion 304 of the screen 300. In addition, the first display unit 213 displays progress information of a job being executed in the printing apparatus 150 by the job information display portion 303, and displays, for example, information relating to an error that has occurred in the printing apparatus 150 by the message display portion 302. This processing flow is then terminated.

The information that the information processing apparatus 100 obtains from the printing apparatus 150 is information for a user to know whether a requested print job is appropriately progressing, and whether a state of a consumable or the like of the printing apparatus 150 is appropriate. However, because a display region is limited in an OS-standard notification method such as a toast, there may be cases in which is not possible to perform a display appropriately. Therefore, configuration may be taken such that a vendor generates their own application to display status information of each ink of the printing apparatus, progress information of a job being executed in the printing apparatus, and information regarding an error that has occurred. In a case of the desktop mode or in a state in which a window of another piece of software has not been started even if it is the tablet mode, the UI of the application 211 is displayed instead of a toast display. By this it is possible to perform a display while bothering a user as little as possible.

In addition, the processing flow illustrated in FIG. 5 has processing details that are based on default values of the simple settings illustrated in FIG. 4. Therefore, if a change from the default values in the option setting screen 400 of FIG. 4 is performed, corresponding determination processing in the processing of FIG. 5 is omitted.

Therefore, by the present embodiment, it is possible to appropriately change whether to perform a display by a detailed UI or whether to perform a simplified notification by using an OS notification function or the like, in accordance with an operation mode of the OS and a window start state of another piece of software. In the case of a simplified notification, because, in comparison to a detailed UI display, a window size is smaller and display content is limited to information of minimum necessary, it is possible to perform a notification without obstructing a user operation.

Second Embodiment

In the present embodiment, in addition to the configuration explained in the first embodiment, explanation is given regarding a configuration that enables display control of an application in accordance with a job progress status, by confirming an issued job progress status and error information of a printing apparatus. Note that basic operation in a system of the second embodiment is similar to that of the first embodiment, and only differences are explained. In addition, in the figures, explanation is given by adding the same reference numerals to the same configurations.

Figure 6:
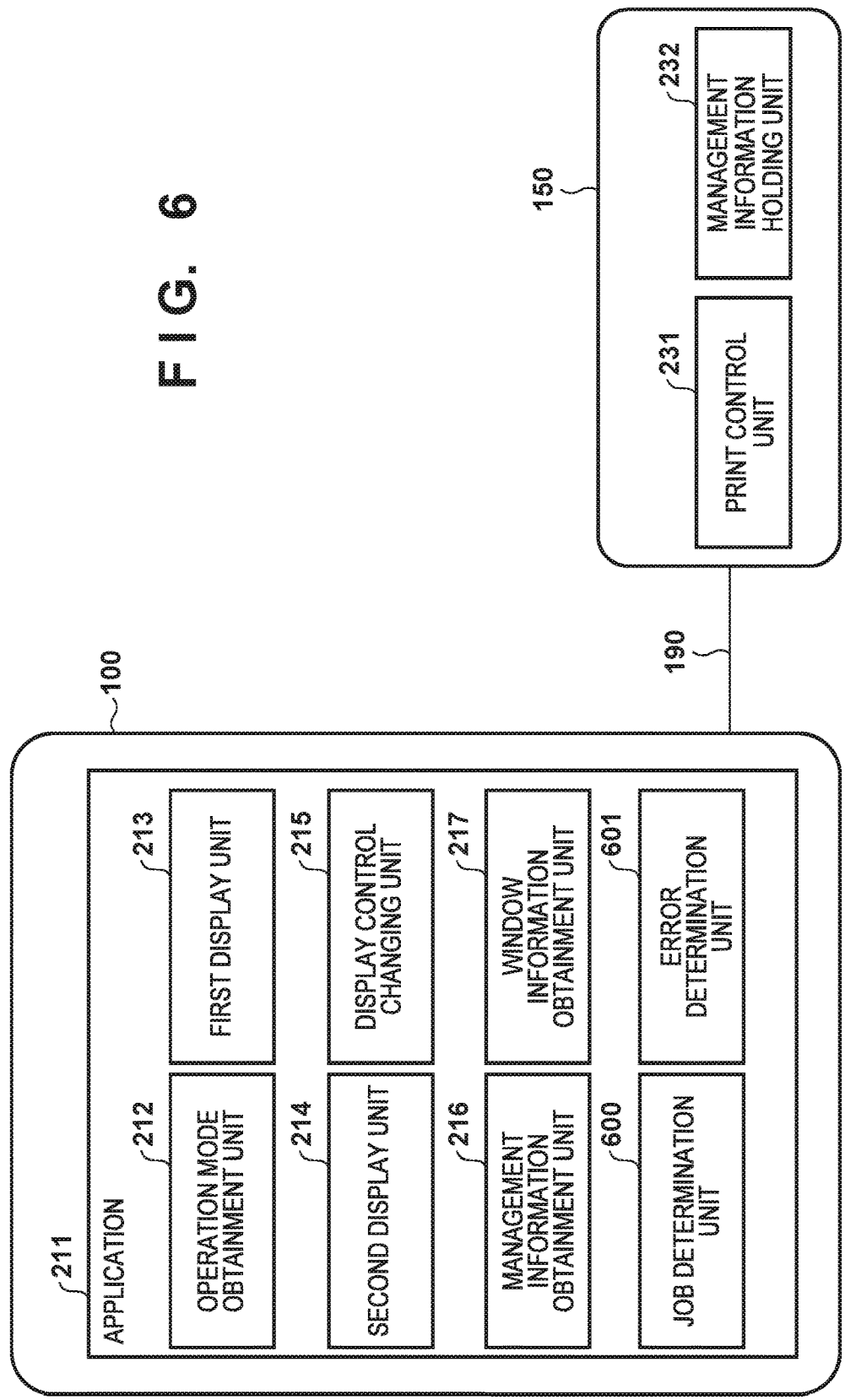
FIG. 6 is a view illustrating an example of a configuration of a printing apparatus and an information processing apparatus according to a second embodiment.

FIG. 6 illustrates a software configuration example of a system according to the second embodiment. The application 211 operates on the information processing apparatus 100. The application 211 is provided with a job determination unit 600 and an error determination unit 601 in addition to the operation mode obtainment unit 212, the first display unit 213, the second display unit 214, the display control changing unit 215, the management information obtainment unit 216, and the window information obtainment unit 217 indicated in the first embodiment.

The job determination unit 600 determines, from information relating to a job in the managed information obtained from the printing apparatus 150 by the management information obtainment unit 216, whether a job for which execution was requested by itself is currently executing in the printing apparatus 150. The error determination unit 601 determines, based on information relating to an error in the managed information obtained from the printing apparatus 150 by the management information obtainment unit 216, whether an error such as printing by the printing apparatus 150 stopping has occurred. For example, in the error determination unit 601, it is determined based on error classification information in the information relating to an error obtained from the printing apparatus 150, whether printing has stopped. As the error classification information of each error, a state such as a service call, an operator call, or a warning is obtained. The error determination unit 601 determines that printing is stopped if an error classified into the classifications of a service call or an operator call has occurred, and does not determine that printing is stopped if an error classified into the classification of a warning has occurred.

The display control changing unit 215 changes the display of the application 211 based on the information obtained by the operation mode obtainment unit 212 and the window information obtainment unit 217, the determination result of the job determination unit 600, and the determination result of the error determination unit 601.

Figure 8:
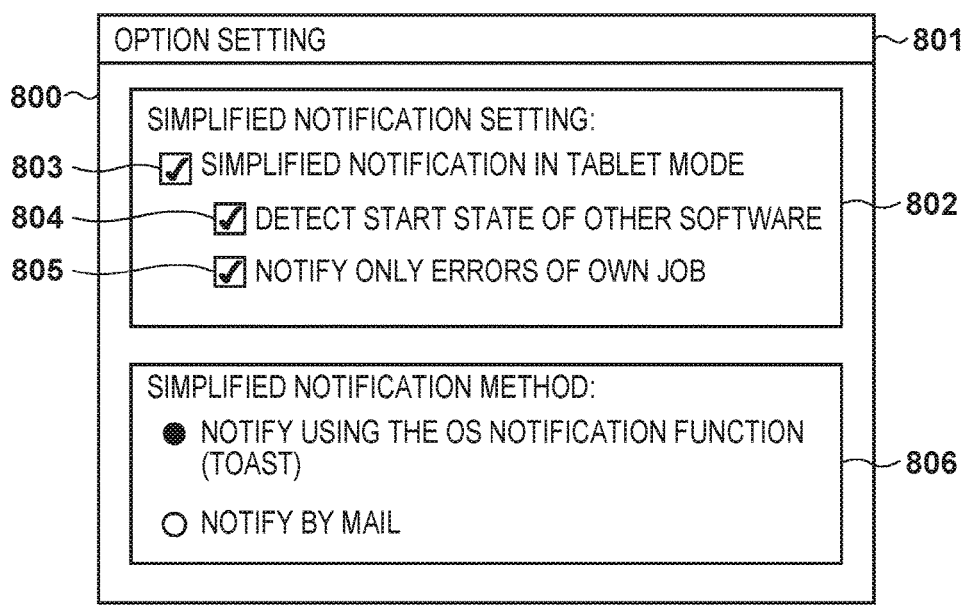
FIG. 8 is a view illustrating a display example of an option setting screen according to the second embodiment.

FIG. 8 illustrates a display example of an option setting screen 800 of the application 211 according to the present embodiment. The option setting screen 800 is displayed when the option setting button 305 of FIG. 3A is pressed. The option setting screen 800 is configured by including a title bar 801, a simplified notification setting portion 802, and a simplified notification method setting portion 806. Note that because it is similar to the first embodiment except for a setting item 805 of the simplified notification setting portion 802, explanation is omitted.

In the simplified notification setting portion 802, the setting item 805 of whether to notify only an error for a job instructed by itself, when a setting item 803 for whether to perform a simplified notification in the specific operation mode (here, the tablet mode) in the OS is ON is included. As a default setting, the setting item 805 is ON by the entry of a check in a check-box. In this state, a simplified notification as illustrated in FIG. 3B is displayed on in the case of the tablet mode and when an error has occurred for a job that it made an instruction for. Notification is not performed if there is no error in a job that it instructed. By removing the check of the setting item 805 to turn the setting OFF, when an error has occurred, a simplified notification is performed if in the tablet mode, regardless of whether an error has occurred in a job that it instructed.

[Processing Flow]

Figure 7:
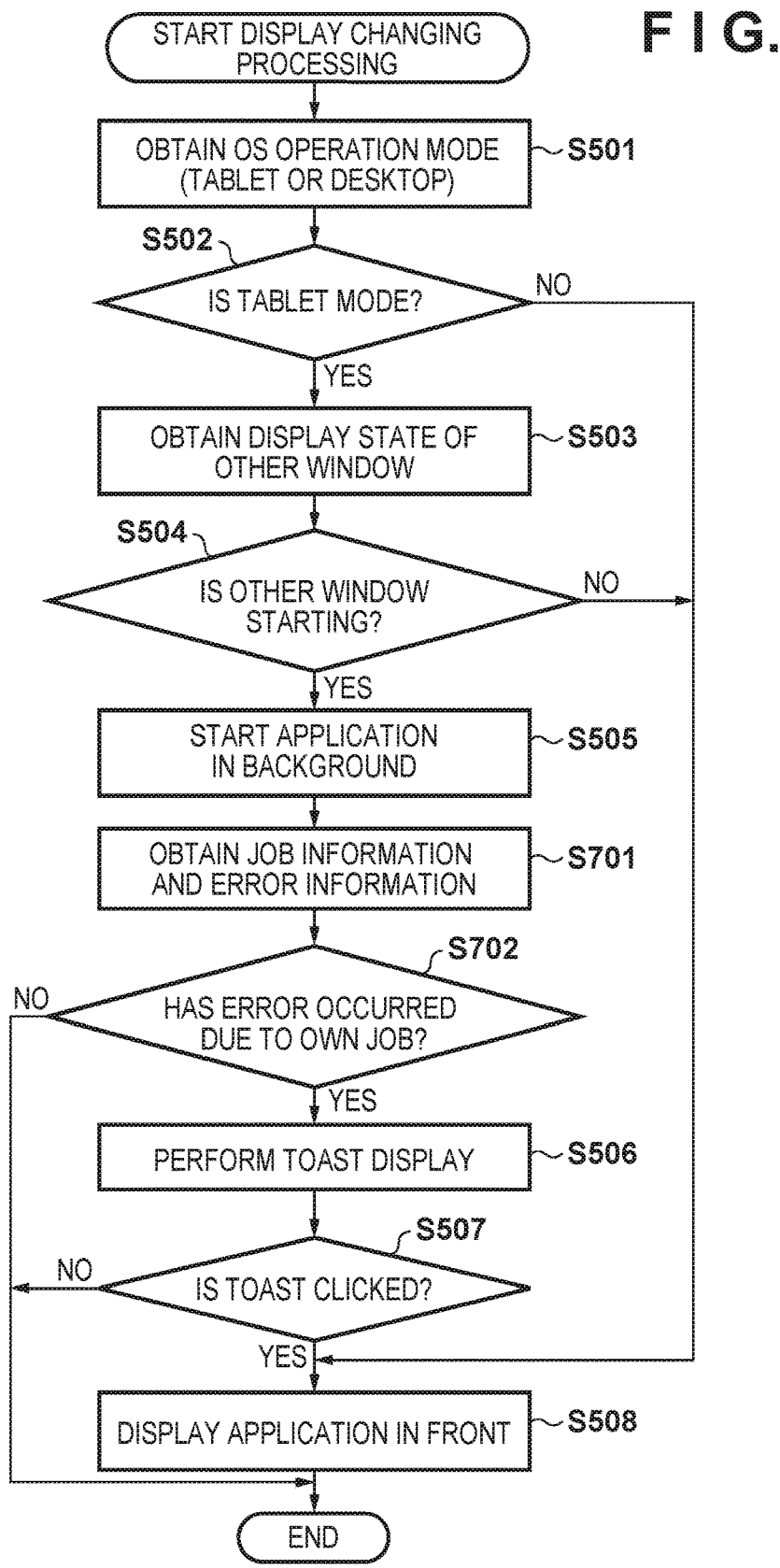
FIG. 7 is a flowchart for the display change processing according to the second embodiment.

FIG. 7 is a flowchart of display change processing at a time of the start of an application according to the present embodiment. Explanation is given only for differences with the processing flow of FIG. 5 that is indicated in the first embodiment. This processing flow is realized by the CPU 103 of the information processing apparatus 100 reading the application 211 stored in the storage apparatus 106 or the like and executing it. For FIG. 7, it is assumed to be a state in which, in the option setting screen 800 illustrated in FIG. 8, the setting items 803 to 805 of the simplified notification setting portion 802 are all set to ON, and the simplified notification method setting portion 405 is set so that notifications are performed using the OS notification function (toast).

After the processing of step S505, in step S701 the application 211 obtains, by the management information obtainment unit 216, for example, the error information, job information, and ink information of the printing apparatus 150 that has been caused to be held by the management information holding unit 232.

In step S702, the application 211 determines whether there is an error based on the operated requested by the information processing apparatus 100. Here, the application 211, by the job determination unit 600, determines, from the job information obtained in step S701, whether it is in a state in which an error has occurred due to a job that it has instructed execution for. As an example of information used in the determination here, it is possible to use information of a name of an information processing apparatus that issued the job, an owner name that issued the job, or a GUID that uniquely identifies the job. If it determines that an error has occurred in a job that it instructed execution for (YES in step S702), a transition is made to the processing of step S506, and a toast display is performed. If it determines that an error has not occurred in a job that it instructed execution for (NO in step S702), this processing flow terminates. In other words, if an error has not occurred in a job that it instructed execution for, an error notification screen is not displayed. Processing for step S506 onward is similar to that in the first embodiment.

Therefore, by the present embodiment, in addition to the effect of the first embodiment, it is possible to perform a notification that does not obstruct user work as much as possible, even in cases other than where a job issued by an information processing apparatus itself has stopped due to an error. Note that, in the present embodiment, although description was given in a case in which a job issued by an information processing apparatus itself is stopped due to an error, in addition configuration make be taken, for example, to change whether to perform a simplified notification in accordance with a classification or an emergency level of the error.

Another Embodiment

Note that, in the above described embodiment, although explanation was given regarding a notification method for a case where an error has occurred, additionally configuration may be taken such that notification is performed by a similar method when starting printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-047370, filed Mar. 10, 2016, which is hereby incorporated by reference herein in its entirety.

What is claimed is:

1. An information processing apparatus capable of communicating with an external apparatus and operating in a plurality of operation modes which include a first operation mode in which one application exclusively displays a window in an application display area and a second operation mode in which a plurality of applications can display windows respectively in the application display area, the information processing apparatus comprising:

at least one processor that executes instructions to:
obtain information transmitted from an external apparatus; and
cause a notification to be performed based on the obtained information,
wherein, in a case where the information processing apparatus is operating in the first operation mode, a notification based on the obtained information is performed in a second notification screen that is smaller than a first notification screen, and, in a case where the information processing apparatus is operating in the second operation mode, a notification based on the obtained information is performed in the first notification screen,
said information processing apparatus further comprising at least one memory storing a first application, which when executed by the at least one processor, operates to determine whether a window provided by a second application different from the first application is being displayed on a display unit, in a case where the information processing apparatus is operating in the first operation mode, and
wherein, in a case where the information processing apparatus is operating in the first operation mode and it is determined that the window provided by the second application is being displayed, the notification based on the obtained information is performed in the second notification screen.

2. The information processing apparatus according to claim 1, wherein the first notification screen includes at least one of information indicating an overview of the obtained information, and a message to the effect that there is information to be notified.

3. The information processing apparatus according to claim 1, wherein the second notification screen is a display screen that uses a notification function of an operating system of the information processing apparatus.

4. The information processing apparatus according to claim 3, wherein the notification function of the operating system is a toast notification function.

5. The information processing apparatus according to claim 1, wherein the notification based on the obtained information is an error notification.

6. The information processing apparatus according to claim 5
wherein the at least one processor further executes instructions to determine, based on the obtained information, whether an error has occurred based on an operation requested of the information processing apparatus, in a case where the first operation mode is being performed,
wherein in a case where it is determined that an error has not occurred based on the operation request of the information processing apparatus, the notification is not performed.

7. The information processing apparatus according to claim 1, wherein the at least one processor further executes to receive a condition setting for performing the notification.

8. The information processing apparatus according to claim 1, wherein the first application, when executed by the at least one processor, obtains the information transmitted from a printer as the external apparatus, and wherein the notification associated with the printer is performed.

9. The information processing apparatus according to claim 1, wherein if the displayed second notification screen is selected, in the first operation mode, the first notification screen is displayed.

10. The information processing apparatus according to claim 1, further comprising:
at least one memory storing a first application, when executed by the at least one processor, operates to determine whether a window provided by a second application different from the first application is being displayed on a display unit, in a case where the information processing apparatus is operating in the first operation mode, and
wherein, in a case where the information processing apparatus is operating in the first operation mode and it is determined that the window provided by the second application is being displayed, the window provided by the second application is maintained and the notification based on the obtained information is performed in the second notification screen with a simplified configuration.

11. The information processing apparatus according to claim 1, wherein the second notification screen disappears from a display unit when a predetermined interval passed since being displayed.

12. A display control method in an information processing apparatus capable of communicating with an external apparatus and operating in a plurality of operation modes which include a first operation mode in which one application exclusively displays a window in an application display area and a second operation mode in which a plurality of application can display windows respectively in the application display area, comprising:
obtaining information transmitted from an external apparatus; and
causing a notification to be performed based on the obtained information,
wherein, in a case where the information processing apparatus is operating in the first operation mode, a notification based on the obtained information is performed in a second notification screen that is smaller than a first notification screen, and, in a case where the information processing apparatus is operating in the world operation mode, a notification based on the obtained information is performed in the first notification screen,
wherein a first application is stored in the information processing apparatus,
wherein the method further comprises determining whether a window provided by a second application different from the first application is being displayed on a display unit, in a case where the information processing apparatus is operating in the first operation mode, and
wherein, in a case where the information processing apparatus is operating in the first operation mode and it is determined that the window provided by the second application is being displayed, the notification based on the obtained information is performed in the second notification screen.

13. The display control method according to claim 12, wherein the first notification screen includes at least one piece of information indicating an overview of the obtained information, and a message to the effect that there is information to be notified.

14. The display control method according to claim 12, wherein the second notification screen is a display screen that uses a notification function of an operating system of the information processing apparatus.

15. The display control method according to claim 12, wherein the notification function of the operating system is a toast notification function.

16. The display control method according to claim 12, wherein the notification based on the obtained information is an error notification.

17. The display control method according to claim 12, further comprising,
determining, based on the obtained information, whether an error has occurred based on an operation requested of the information processing apparatus, in a case where the information processing apparatus is operating in the first operation mode,
wherein in a case where it is determined that an error has not occurred based on the operation request of the information processing apparatus, the notification is not performed.

18. The display control method according to claim 12, further comprising,
receiving a condition setting for performing the notification.

19. The display control method according to claim 12 further comprising: obtaining the information transmitted from a printer as the external apparatus, and, wherein the notification associated with the printer is performed.

20. The display control method according to claim 12, wherein if the displayed second notification screen is selected, in the first operation mode, the first notification screen is displayed.

21. The display control method according to claim 12, wherein a first application is stored in the information processing apparatus, and,
the method further comprising determining whether a window provided by a second application different from the first application is being displayed on a display unit, in a case where the information processing apparatus is operating in the first operation mode, and
wherein, in a case where the information processing apparatus is operating in the first operation mode and it is determined that the window provided by the second application is being displayed, the window provided by the second application is maintained and the notification based on the obtained information is performed in the second notification screen with a simplified configuration.

22. The display control method according to claim 12, wherein the second notification screen disappears from a display unit when a predetermined interval passed since being displayed.

23. An information processing apparatus capable of communicating with an external apparatus and operating in a plurality of operation modes including a tablet mode and a desktop mode provided by an operating system (OS), the information processing apparatus comprising:
at least one processor, and;
at least one memory storing a first application, which when executed by the at least one processor, operates to:
obtain information transmitted from an external apparatus; and
cause a notification to be performed based on the obtained information,
wherein, in case where the tablet mode is being executed, a notification based on the obtained information is performed by using a notification function of the OS, and, in a case where the desktop mode is being executed, a notification based on the obtained information is performed by the first application, wherein the first application further operates to determine whether a window provided by a second application different from the first application is being displayed on a display unit, in a case where the information processing apparatus is operating in the tablet mode, and wherein, in a case where the information processing apparatus is operating in the tablet mode and it is determined that the window provided by the second application is being displayed, the notification based on the obtained information is performed by using a notification function of the OS.

24. A display control method in an information processing apparatus storing a first application, and capable of communicating with an external apparatus and operating in a plurality of operation modes including a tablet mode and a desktop mode provided by an operating system (OS), comprising:

obtaining information transmitted from an external apparatus; and causing a notification to be performed based on the obtained information, wherein, in a case where the tablet mode is being executed, a notification based on the obtained information is performed by using a notification function of the OS, and, in a case where the desktop mode is being executed, a notification based on the obtained information is performed by the first application, wherein the method further comprises determining whether a window provided by a second application different from the first application is being displayed on a display unit, in a case where the information processing apparatus is operating in the tablet mode, and wherein, in a case where the information processing apparatus is operating in the tablet mode and it is determined that the window provided by the second application is being displayed, the notification based on the obtained information is performed by using a notification function of the OS.

* * * * *